United States Patent
Bar-Or

[11] Patent Number: 5,930,440
[45] Date of Patent: *Jul. 27, 1999

[54] FIBER OPTIC PROBE PROTECTOR

[75] Inventor: David Bar-Or, Englewood, Colo.

[73] Assignee: Optical Biopsy Technologies, LLC, Knoxville, Tenn.

[*] Notice: This patent is subject to a terminal disclaimer.

[21] Appl. No.: 09/025,699

[22] Filed: Feb. 18, 1998

[51] Int. Cl.⁶ .................................................. G02B 6/00
[52] U.S. Cl. .............................. 385/136; 385/139; 606/16
[58] Field of Search ................................. 385/136, 137, 385/139, 902; 128/665, 722; 606/15–19

[56] References Cited

U.S. PATENT DOCUMENTS

| | | | |
|---|---|---|---|
| 4,286,585 | 9/1981 | Ogawa | 128/6 |
| 5,185,834 | 2/1993 | Day et al. | 385/47 |
| 5,510,895 | 4/1996 | Sahagen | 356/436 |
| 5,704,892 | 1/1998 | Adair | 600/121 |
| 5,771,327 | 6/1998 | Bar-Or et al. | 385/139 |
| 5,774,610 | 6/1998 | O'Rourke et al. | 385/52 |

*Primary Examiner*—Hemang Sanghavi
*Attorney, Agent, or Firm*—Pitts & Brittian, P.C.

[57] ABSTRACT

A fiber optic probe protector for protecting a fiber optic probe such that sterilization of the probe after each use is not necessary. The fiber optic probe protector includes a sheath, a barrier membrane secured to the first end of the sheath, a handle and a locking assembly. The sheath defines a first end, a second end and a tubular extending therebetween. The handle defines a first end, a second end, an interior cavity extending therebetween. The interior cavity and the tubular cavity cooperate to form a probe passage for receiving a fiber optic probe therethrough. The locking assembly is for securely holding and locking the fiber optic probe in place such that the face of the probe abuts against the barrier membrane.

12 Claims, 4 Drawing Sheets

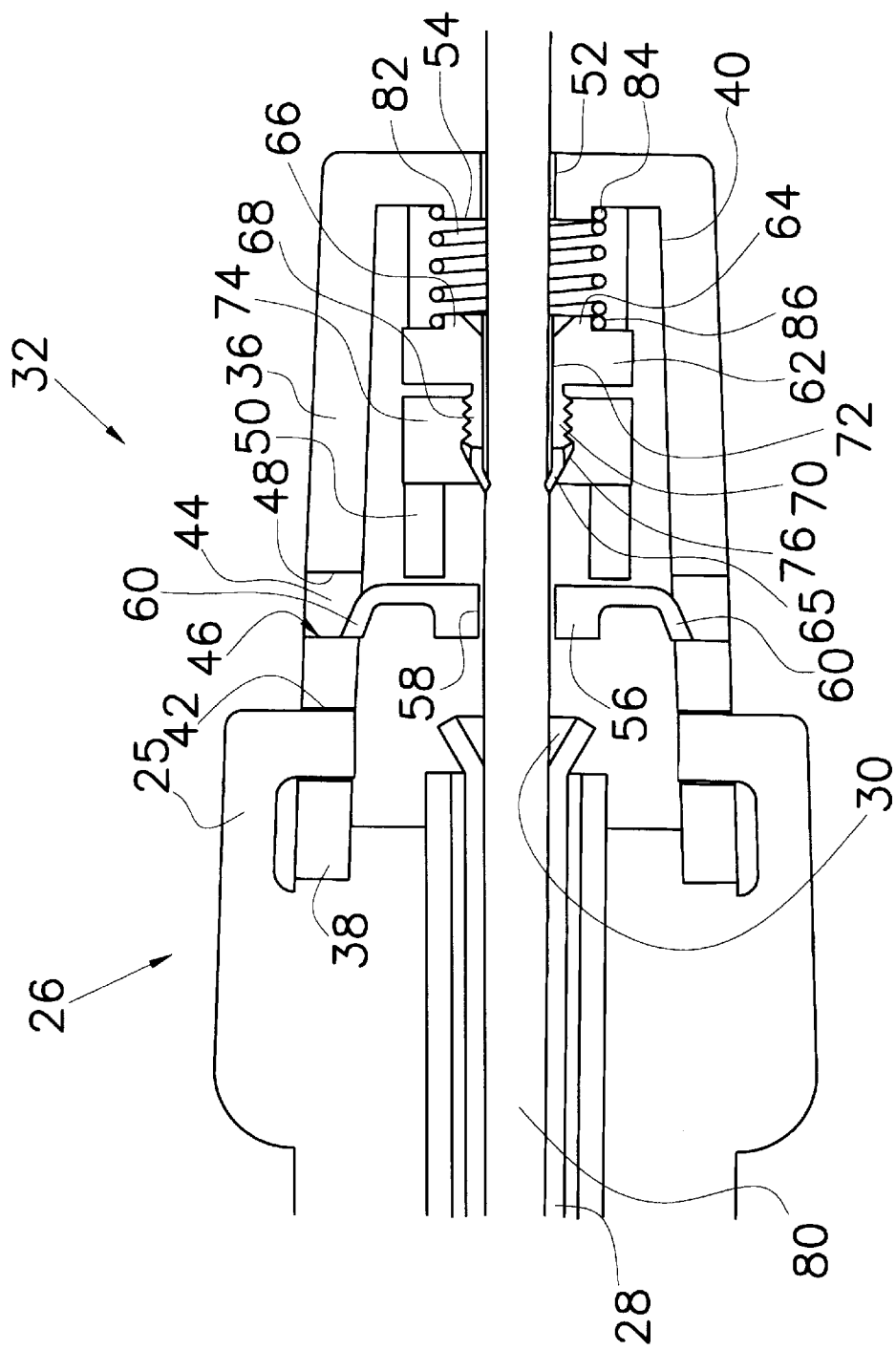

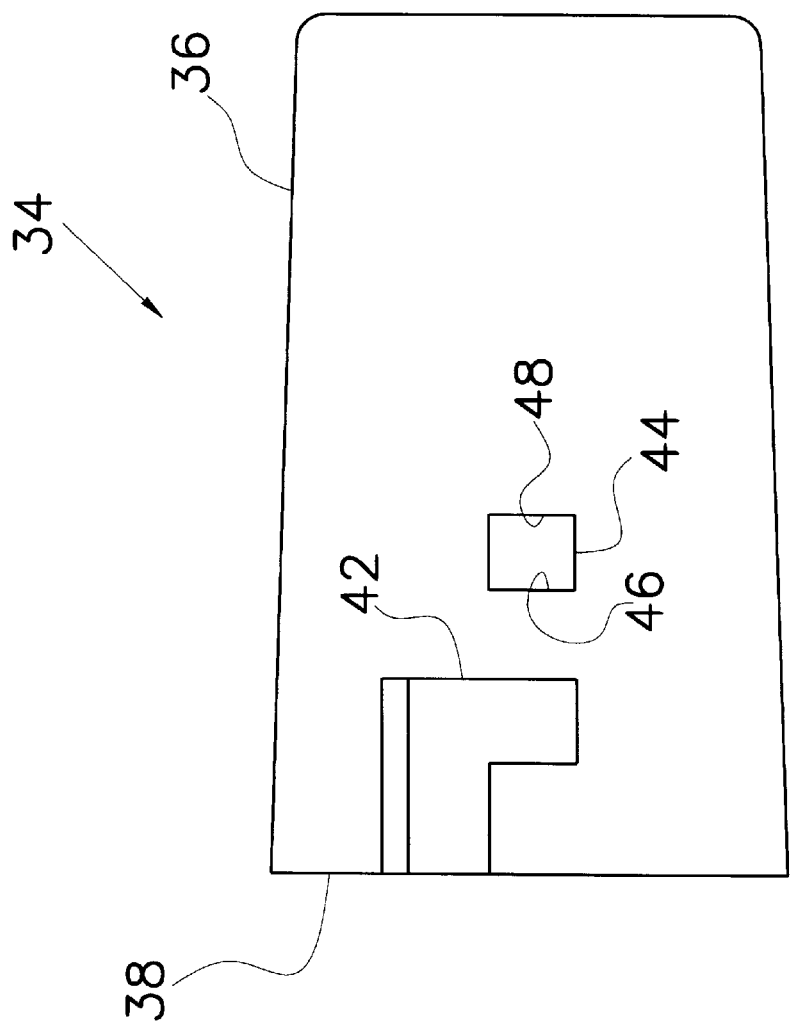

FIBER OPTIC PROBE PROTECTOR

This application in part discloses and claims subject matter disclosed in an earlier filed pending application, Ser. No. 08/749,957 filed on Nov. 18, 1996.

TECHNICAL FIELD

This invention relates to the field of fiber optic probes and more specifically to a probe protector in which a fiber optic probe is receivable.

BACKGROUND ART

Development of a nonsurgical diagnostic technique for detecting cancer has been in demand because of its obvious advantages over traditional biopsy surgery. Laser-induced fluorescence (LIF) has shown great potential for use in an in vivo procedure for the detection of cancerous tissue. Specifically, the LIF technique utilizes a fiber optic probe which consists of a bundle of optical fibers (i.e. a fiber optic cable) including a plurality of excitation fibers and a plurality of emission fibers. The first end of each excitation fiber is optically connected to an excitation light source and the first end of each emission fiber is connected to a light detector. The distal end of the bundle is positioned in the probe for juxtaposition to the tissue in vivo for analysis and preferably touching the tissue. The tissue is excited via the excitation fibers and the emission radiation from the tissue in the form of laser-induced fluorescence is delivered to the detector through the emission fibers. The output signal from the detector is delivered to a computer. Mathematical manipulation of the output signal illustrates whether the tissue is normal or malignant with excellent results.

The main disadvantage with to the use of fiber optic probes is the end of the probe must be cleaned after every use, which leads to degradation of the probe. Also, positioning the probe can be difficult. Specifically, being assured the face of the probe is properly positioned to analyze a section of tissue is of great concern and importance. Further, it is important that the probe remain in desired position during the testing period.

Therefore, it is an object of the present invention to provide a fiber optic probe protector for securely maintaining a fiber optic probe therein.

It is another object of the present invention to provide a fiber optic probe protector which is disposable.

Further, it is another object of the present invention to provide a fiber optic probe protector which is configured to assure proper disposition of the fiber optic probe during testing of a tissue section.

It is yet another object of the present invention to provide a fiber optic probe protector for protecting the distal end of a fiber optic probe.

SUMMARY

Other objects and advantages will be accomplished by the present invention which serves to protect a fiber optic probe. The fiber optic probe protector of the present invention includes a sheath, a handle, a barrier membrane and a locking assembly. The sheath defines a tubular configuration, a first end, and a second end. The handle defines a first end, a second end, and an interior cavity. The tubular cavity and the interior cavity cooperate to form a probe passage for receiving a fiber optic probe therethrough. A barrier membrane is mounted to the first end of the sheath. The locking assembly serves to securely hold the fiber optic probe in place such that the face of the probe abuts against the barrier membrane.

BRIEF DESCRIPTION OF THE DRAWINGS

The above mentioned features of the invention will become more clearly understood from the following detailed description of the invention read together with the drawings in which:

FIG. 3 illustrates an end view of the second end of the handle;

FIG. 4 illustrates a cross sectional view of the coupling secured to the end of the handle; and, FIG. 5 illustrates the outer surface of the coupling housing.

DESCRIPTION OF PREFERRED EMBODIMENTS

A fiber optic probe protector incorporating various features of the present invention is illustrated generally at 10 in the figures. The fiber optic probe protector 10 is designed to protect the face of a fiber optic probe utilized in in vivo procedures. Further, the fiber optic probe protector is disposable and assists in the proper positioning of the probe during tissue analysis.

Figure 1:
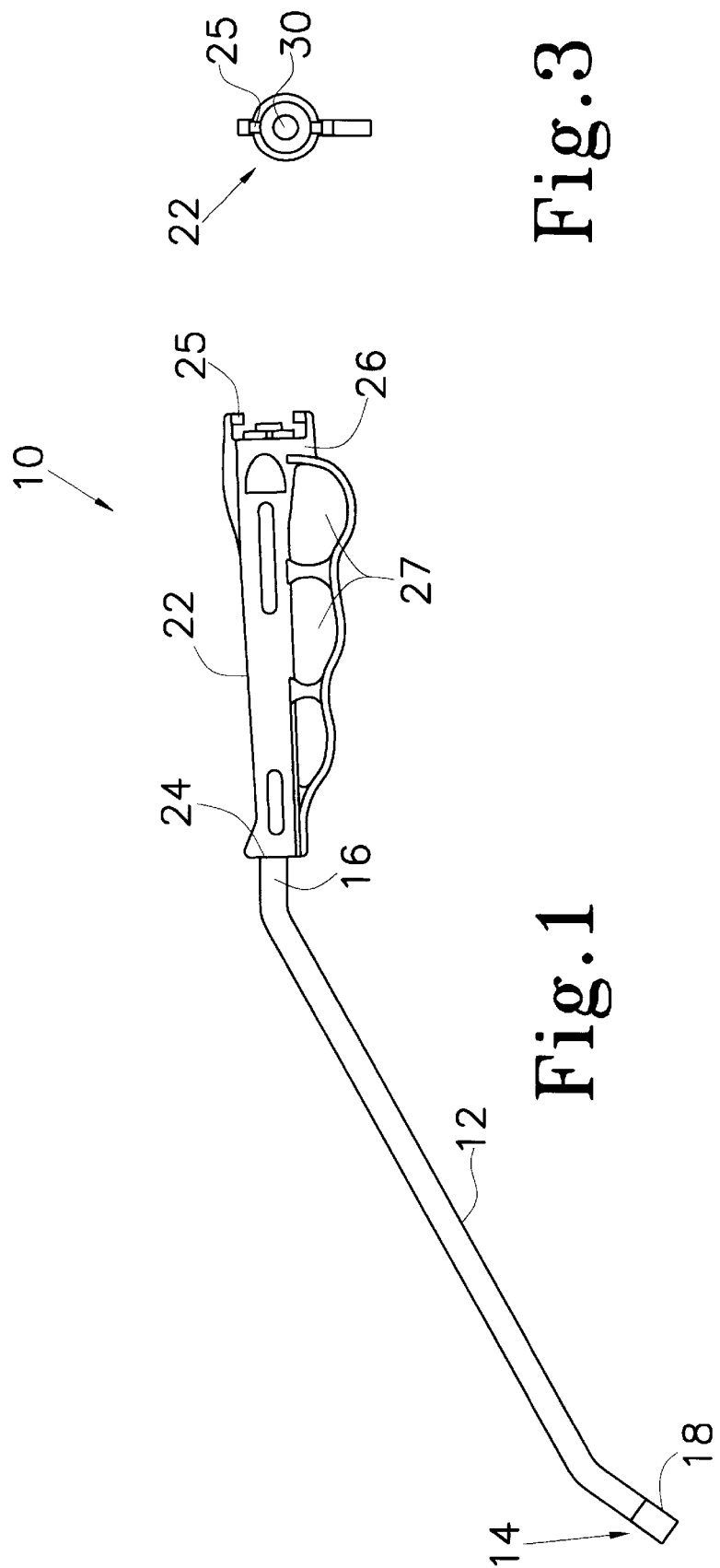
FIG. 1 is a side view of the fiber optic probe protector of the present invention without the coupling in position.
Figure 2:
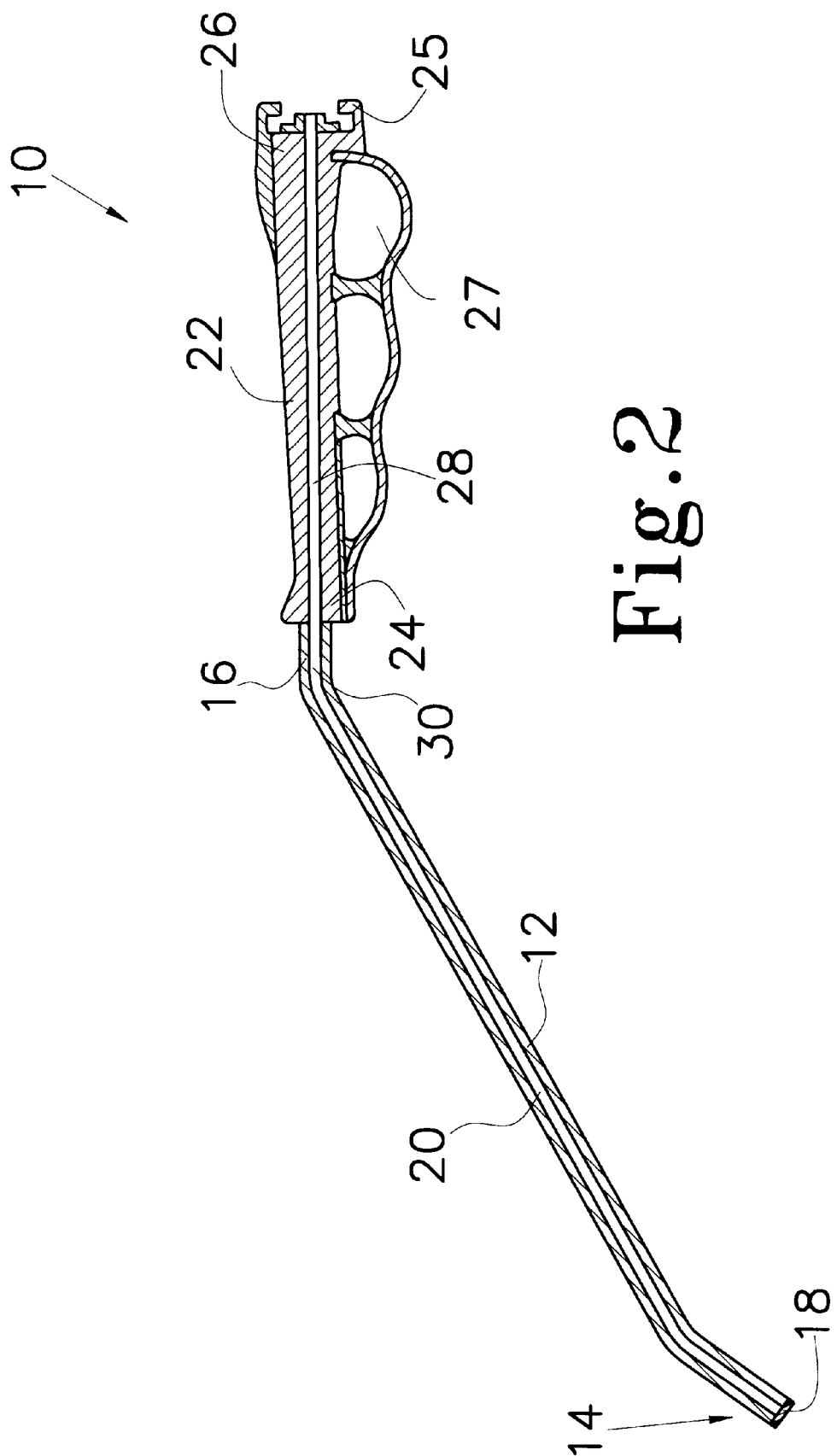
FIG. 2 is a cross sectional view of the fiber optic probe protector of FIG. 1.

The fiber optic probe protector is appropriate for use in the laser-induced fluorescence (LIF) technique which utilizes a fiber optic probe for in vivo tissue diagnosis. As shown in FIG. 1, the fiber optic probe protector 10 is generally comprised of a sheath 12, a barrier membrane 18 secured to a first end of the sheath 12, a handle 22 and a locking assembly 32 for securely maintaining a fiber optic probe within the sheath 12 and handle 22. FIG. 2 illustrates a cross sectional view of the probe protector of FIG. 1. The sheath 12 defines a first end 14, a second end 16 and a tubular cavity 20 for receiving a fiber optic probe 80 therethrough. The sheath 12 is not limited to a specific length and the length is dictated by the use of the fiber optic probe it protects. For example, the sheath 12 of a protector 10 for a probe for oral analysis is shorter in length than the sheath 12 of a protector 10 for a probe for cervical analysis. In the preferred embodiment, the sheath 12 is angled proximate the first end 14, as shown in FIG. 1. In the preferred embodiment, the sheath 12 is fabricated from a rigid material such as plastic or butyrate.

The handle 22 defines a first end 24, a second end 26 and an interior cavity 28 which extends between the first end 24 and the second end 26. The second end 16 of the sheath 12 is mounted to the first end 24 of the handle 22. The tubular cavity 20 of the sheath 12 and the interior cavity 28 of the handle 22 cooperate to form a probe passage 30, as shown in FIG. 2. An end view of the second end 26 of the handle 22 is shown in FIG. 3 and illustrates the end view of the configuration of the probe passage 30. The handle 22 is configured to be easily gripped. In the preferred embodiment, the handle 22 defines three openings 27 configured to receive the fingers of a user, as shown in FIGS. 1 and 2. The handle 22 is fabricated from a rigid material such as plastic or butyrate.

The barrier membrane 18 which is secured to the first end 14 of the sheath 12 is fabricated from a flexible material which is optically appropriate. In the preferred embodiment, the barrier membrane 18 is fabricated from polyurethane or material of the like. Preferably, the barrier membrane 18 is molded into a cap-like form and adhered to the exterior of the sheath 12. The barrier membrane 18 protects the face of the probe and maintains its integrity such that the probe does not require sterilization after each use. Further, the barrier membrane 18 is flexible and assures that the face of the probe 80 abuts against the barrier membrane 18 when positioning the probe within the probe protector. Moreover, the barrier membrane 18 permits optical transmission therethrough without optical interference.

The locking assembly 32 serves to lock a fiber optic probe 80 in position. The locking assembly 32 is generally comprised of a coupling 34 and coupling extensions 25 defined by the second end 26 of the handle 22. The coupling 34 is releasably securable to the second end 26 of the handle 22 via the coupling extensions 25. The coupling 34 is configured to receive and securely hold a fiber optic probe 80 in position within the probe passage 30. In the preferred embodiment, the coupling 34 retains the fiber optic probe 80 within the probe passage 30 and against the barrier membrane 18 under a spring load such that the face of a fiber optic probe 80 abuts against the barrier membrane 18.

The preferred embodiment of the locking assembly 32 is shown in FIG. 4. The coupling 34 generally includes a housing 36, a keeper 56, a pressure plate 74, a collet 62 and a spring 82. The housing 36 defines a first end 38 and a second end 40. A pair of oppositely disposed L-shaped locking slots 42 are defined proximate the first end 38 and a pair of oppositely disposed keeper finger cutouts 44 are defined proximate the locking slots 42, as shown in FIG. 5. Each keeper finger cutout 44 defines a finger resting face 46 and a secondary face 48 opposite the finger resting face 46. A pair of oppositely disposed keeper ribs 50 extend from the second end 40 of the housing 36 toward the first end 38, as shown in FIG. 4. The keeper ribs 50 extend slightly beyond the secondary face 48 of the keeper finger cutouts 44. The second end 40 defines a fiber receiving opening 52 therethrough and an annular extension 54 disposed around the opening 52 and is configured to closely receive the first end 84 of the spring 82.

The keeper 56 defines a fiber receiving opening 52 therethrough and two oppositely disposed keeper fingers 60.

The collet 62 defines an annular extension 64 extending from a first end 66 thereof, a male threaded extension 70 extending from the second end 68 thereof and a fiber receiving opening 72 extending therethrough. Three gripping fingers 65 extend from the threaded extension 70 in an equally spaced manner. The annular extension 64 is configured to closely receive the second end 86 of the spring 82.

The pressure plate 74 defines a female threaded opening 76 therethrough for receiving the threaded extension 70 of the collet 62.

The coupling 34 locks onto the second end 26 of the handle 22 and securely holds a fiber optic probe 80 in a spring loaded disposition in the following manner. A fiber optic probe 80 is fed through the fiber receiving opening 72 of the collet 62. The length of the probe 80 extending from the second end 68 of the collet 62 is such that the probe 80, when inserted through the probe passage 30, would abut against the barrier membrane. The pressure plate 74 is screwed onto the collet 62 which causes the gripping fingers 65 to tighten down on the fiber optic probe 80 such that it is held tightly within the collet 62. The second end 86 of the spring 82 is mounted to the collet annular extension 64, the collet 62 and pressure plate 74 are inserted into the housing 36 and the first end 84 of the spring 82 is mounted to the housing annular extension 54. The keeper 56 is threaded or strung onto the fiber optic probe 80 via its fiber receiving opening 58 and the keeper fingers 60 are snapped into place such that they rest against the finger resting face 46 of the keeper finger cutouts 44. The keeper 56 serves to maintain the pressure plate 74 and collet 62 in the housing 36. The fiber optic probe 80 is inserted through the probe passage 30 to the first end 14 of the sheath 12. The housing 36 is secured to second end 36 of the handle 22 by inserting the coupling extensions 25 defined by the handle 22 into the locking slots 42 of the housing 36 and twisting such that coupling 34 is secured in place. The fiber optic probe 80 is most ideally positioned when the face of the probe 80 pushes slightly against the barrier membrane 18.

Once a fiber optic probe 80 is secured within the probe protector, as described above, it is ready to utilized to take LIF measurements. Because the first end 14 of the sheath 12 is angled, positioning of the probe protector 10 to take selected measurements is simplified. Once all measurements have been taken, the fiber optic probe 80 is removed from the probe protector 10 and the probe protector 10 can be disposed of. Because the face of the fiber optic probe 80 is protected, it is not necessary to autoclave or sterilize the probe 10 after every use such that early degradation of the probe is prevented.

From the foregoing description, it will be recognized by those skilled in the art that a fiber optic probe protector offering advantages over the prior art has been provided. Specifically, the fiber optic probe protector provides a means for protecting the face of a fiber optic probe such that the probe does not have to be sterilized after every use. Further, while maintaining the barrier integrity, the probe protector does not interfere with the optical transmission between the probe and the tissue being analyzed. Further, the probe protector is disposable.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A fiber optic probe protector comprising:
    a sheath defining a first end, a second end and a tubular cavity extending between said first end and said second end;
    a barrier membrane mounted to said first end of said sheath;
    a handle defining a first end, a second end, and an interior cavity, said second end of said sheath being mounted to said first end of said handle, said interior cavity and said tubular cavity of said sheath defining a probe passage for receiving a fiber optic probe therethrough such that the face of the probe abuts against said barrier membrane; and,
    a locking assembly for locking the fiber optic probe in position.

2. A fiber optic probe protector comprising:
    a sheath defining a first end, a second end and a tubular cavity extending between said first end and said second end;
    a barrier membrane mounted to said first end of said sheath;
    a handle defining a first end, a second end, and an interior cavity, said second end of said sheath being mounted to said first end of said handle, said interior cavity and said tubular cavity of said sheath defining a probe passage for receiving a fiber optic probe therethrough such that the face of the probe abuts against said barrier membrane; and, a locking assembly for locking the fiber optic probe in position, said locking assembly being configured to maintain the fiber optic probe in a spring loaded configuration against said barrier membrane.

3. The fiber optic probe protector of claim 2 wherein said barrier membrane is fabricated from polyurethane.

4. The fiber optic probe protector of claim 2 wherein said locking assembly includes a coupling, said second end of said handle being configured such that said coupling is releasably securable thereto.

5. The fiber optic probe protector of claim 4 wherein said coupling includes a housing, a collet, a pressure plate and a spring, said collet and said pressure plate cooperating to receive a fiber optic probe therethrough, said collet defining a plurality of gripping teeth for gripping the exterior of the fiber optic probe, said pressure plate being securable to said collet and causing said plurality of gripping teeth to bear down on the exterior of the fiber optic probe when said pressure plate is secured to said collet, said housing being configured to receive said collet and said pressure plate therein, said housing defining a fiber receiving opening for receiving the fiber optic probe therethrough, said spring being mounted to and between said collet and said housing such that the fiber optic probe is spring loaded.

6. A fiber optic probe protector comprising:

a sheath defining a first end, a second end and a tubular cavity extending between said first end and said second end;

a barrier membrane mounted to said first end of said sheath, said barrier membrane being fabricated from a flexible material which permits the passage of optical waves therethrough in an unrefracted manner;

a handle defining a first end, a second end, and an interior cavity, said second end of said sheath being mounted to said first end of said handle, said interior cavity and said tubular cavity of said sheath defining a probe passage for receiving a fiber optic probe therethrough such that the face of the probe abuts against said barrier membrane; and, a locking assembly for locking the fiber optic probe in position.

7. The fiber optic probe protector of claim 6 wherein said locking assembly includes a coupling, said second end of said handle being configured such that said coupling is releasably securable thereto, said coupling including a housing, a collet, a pressure plate and a spring, said collet and said pressure plate cooperating to receive a fiber optic probe therethrough, said collet defining a plurality of gripping teeth for gripping the exterior of the fiber optic probe, said pressure plate being securable to said collet and causing said plurality of gripping teeth to bear down on the exterior of the fiber optic probe when said pressure plate is secured to said collet, said housing being configured to receive said collet and said pressure plate therein, said housing defining a fiber receiving opening for receiving the fiber optic probe therethrough, said spring being mounted to and between said collet and said housing such that the fiber optic probe is spring loaded.

8. The fiber optic probe protector of claim 6 wherein said barrier membrane is fabricated from polyurethane.

9. A fiber optic probe protector comprising:

a sheath defining a first end, a second end and a tubular cavity extending between said first end and said second end;

a barrier membrane mounted to said first end of said sheath;

a handle defining a first end, a second end, and an interior cavity, said second end of said sheath being mounted to said first end of said handle, said interior cavity and said tubular cavity of said sheath defining a probe passage for receiving a fiber optic probe therethrough such that the face of the probe abuts against said barrier membrane; and, a locking assembly for locking the fiber optic probe in position, said locking assembly including a coupling, said second end of said handle being configured such that said coupling is releasably securable thereto.

10. The fiber optic probe protector of claim 9 wherein said barrier membrane is fabricated from a flexible material which permits the passage of optical waves therethrough in an unrefracted manner.

11. The fiber optic probe protector of claim 10 wherein said barrier membrane is fabricated from polyurethane.

12. The fiber optic probe protector of claim 9 wherein said coupling includes a housing, a collet, a pressure plate and a spring, said collet and said pressure plate cooperating to receive a fiber optic probe therethrough, said collet defining a plurality of gripping teeth for gripping the exterior of the fiber optic probe, said pressure plate being securable to said collet and causing said plurality of gripping teeth to bear down on the exterior of the fiber optic probe when said pressure plate is secured to said collet, said housing being configured to receive said collet and said pressure plate therein, said housing defining a fiber receiving opening for receiving the fiber optic probe therethrough, said spring being mounted to and between said collet and said housing such that the fiber optic probe is spring loaded.

* * * * *